Oct. 4, 1938.  G. C. DAVIS ET AL  2,132,204
TWO-STEP SOLENOID VALVE
Filed Nov. 16, 1935  2 Sheets-Sheet 1
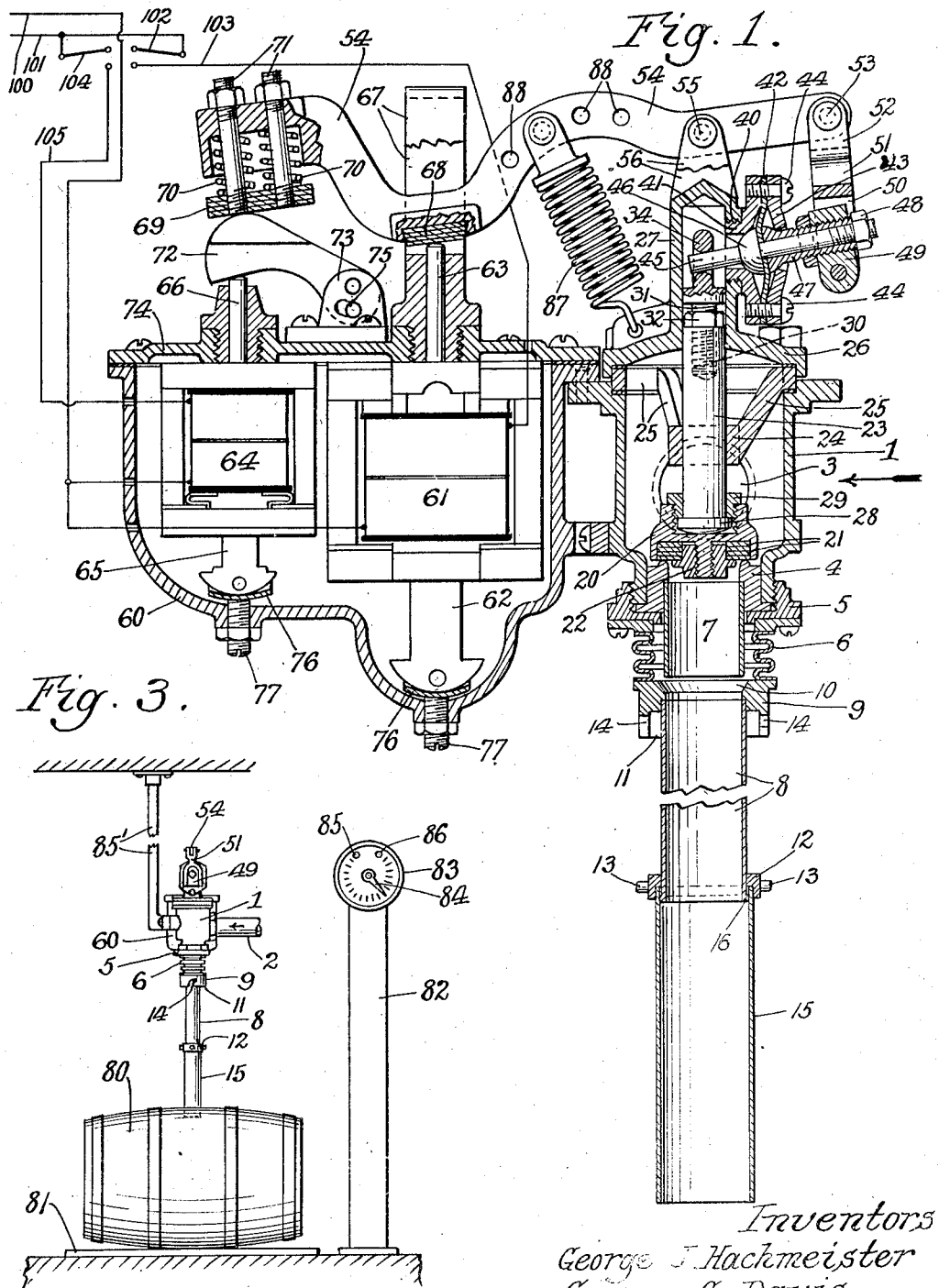
Inventors
George J. Hachmeister
George C. Davis
by [signature] Attys

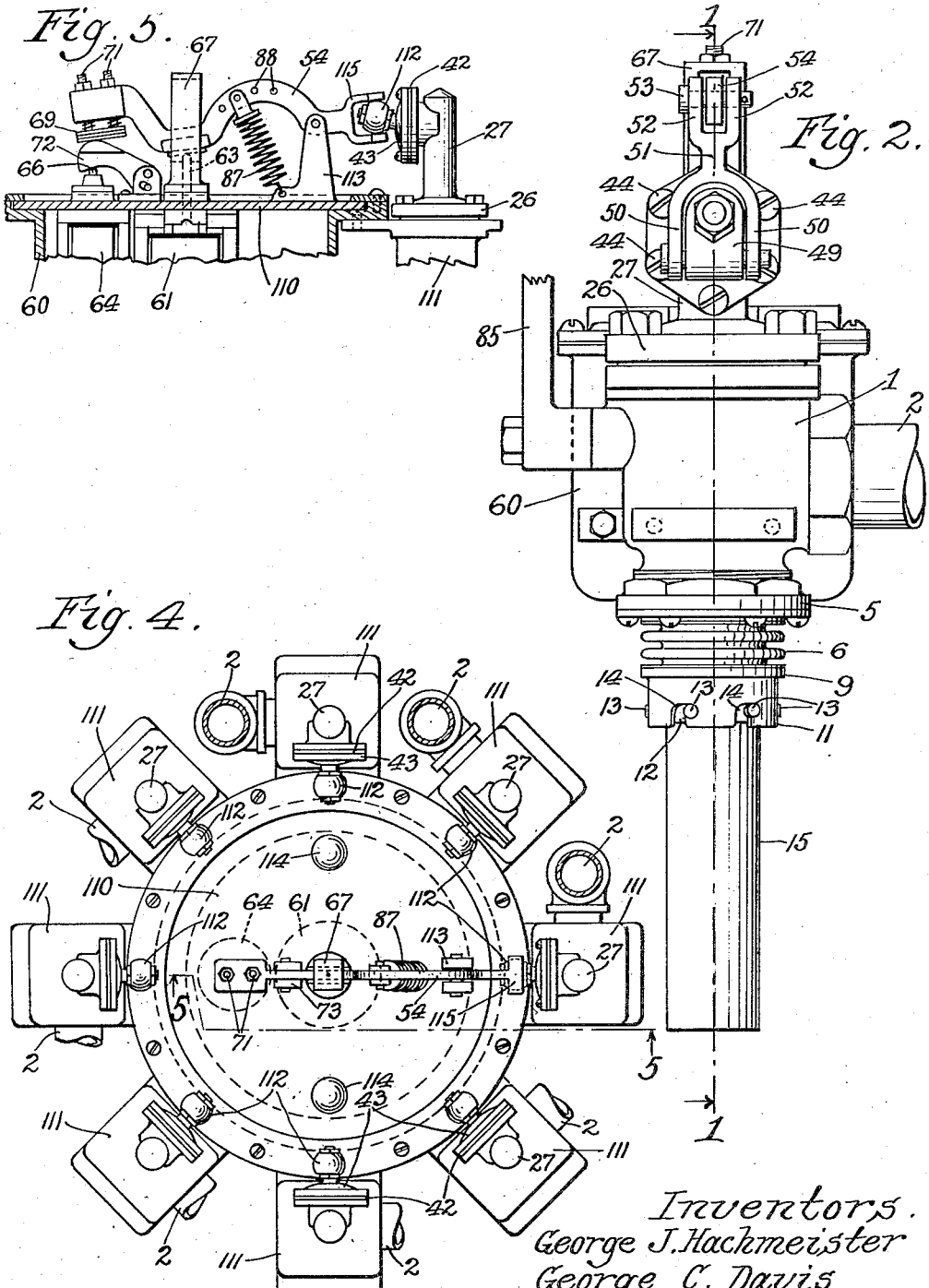

Patented Oct. 4, 1938

2,132,204

UNITED STATES PATENT OFFICE 2,132,204

TWO-STEP SOLENOID VALVE

George C. Davis and George J. Hachmeister, Chicago, Ill., assignors to Davis Regulator Company, Chicago, Ill., a corporation of Illinois Application November 16, 1935, Serial No. 50,102

3 Claims. (Cl. 137—139)

Our invention relates to improvements in valves and has for one object to provide a solenoid control valve which will give a plurality of rates of flow. The invention is especially adapted for use in connection with weighing or measuring liquids where it is desirable to first fill a receptacle with a relatively rapid flowing large volume stream and then as the maximum amount is reached, it decreases the flow so that at the end of the operation a relatively small stream is supplied to complete the filling. This by means of our invention is accomplished by the use of one valve having a plurality of control positions.

In general, the device is applicable to filling barrels or kegs with whiskey, ink, or other liquids and it comprises in general a two-position valve. In one position, the valve is wide open and full volume flow takes place. Toward the end of the operation, a solenoid is operated to partially close the valve and a throttle micrometric flow takes place. Then at the end of the operation, a second solenoid is operated to shut off the valve. Other objects will appear from time to time throughout the specification and claims.

Our invention is illustrated more or less diagrammatically in the accompanying drawings, wherein—

Figure 1 is a transverse section through the valve and operating mechanism along the line 1—1 of Figure 2;

Figure 2 is an outside elevation of the valve looking in the direction of the arrow on Figure 1;

Figure 3 is a diagrammatic showing of a use of the valve;

Figure 4 is a plan view of a battery of valves with a single valve control whereby materials may be mixed;

Figure 5 is a section along the line 5—5 of Figure 4.

Like parts are indicated by like characters throughout the specification and drawings.

1 is a valve housing having an inlet pipe 2, terminating in an inlet port 3. This housing is generally cylindrical and at its lower side contains a valve seat 4, held to the housing by a gland 5, from which depends downwardly a sylphon flexible connection 6. A sleeve 7, carried by the seat 4 and extending downwardly therefrom masks the sylphon connection and is in line with a generally fixed filler pipe 8, which is socketed in the ring 9, mounted on the lower end of the sylphon. This ring 9 is funneled or expanded at 10, to provide clearance so that the pipe 8 may be moved about without causing binding between it and the sleeve 7. The ring 9, at its lower end has a skirt 11, of larger inner diameter than the pipe 8. 12 is a ring slidable along the pipe 8 having lugs 13 adapted to engage notches 14 in the skirt 11 whereby the ring 12 and the extension pipe 15 may be held in the upper position as shown in Figure 2 or may assume the lower position as shown in Figure 1 when a bead 16 on the end of the pipe 8 holds the parts together.

20 is a valve body having valve washers 21 held in place therein by means of a nut 22 and adapted to engage the upper edge of the valve seat 4. This valve body is carried on a plunger 23 guided in the sleeve 24, which sleeve is supported on a spider 25. The spider 25 is socketed in the housing and the upper open end of the housing and spider is closed by a cover plate 26. This cover plate 26 has an upwardly extending hollow bracket 27 in which the plunger 23 is also guided, the plunger being loose and free to travel. The plunger 23 is provided with a head 28 socketed in the valve body 20 and held in place by a screw gland 29. The upper end of the plunger 23 is counterbored and threaded as indicated at 30, and a threaded pin 31 is screwed therein. A lock nut 32 limits the movement of the pin and the pin terminates in an eyelet 34.

The wall of the hollow bracket is apertured at 40. Threaded in this aperture is a flanged centrally apertured screw 41. 42 is a diaphragm held upon the flanged screw 41 by means of a cover plate 43. The flanged plate and diaphragm being held together by screws 44. 45 is a valve actuating lever. It passes through the diaphragm 42 and where it passes through the diaphragm is provided with a ball extension 46 and is held in place on the diaphragm by a hollow screw 47 having a similar ball extension. This hollow screw is held in place by a nut 48 threaded on the lever. The ball thus formed is socketed in the members 41 and 43 so that the valve actuating lever is free to move the valve plunger. The relationship of the parts is such that the entire area enclosed within the housing above the valve seat clear up to the diaphragm is exposed to the high pressure of the material transmitted through the opening 3, while the valve may be reciprocated by manipulation of the lever and consequent bending of the diaphragm without the necessity of any packing gland and without any possibility of leakage. The hollow screw 47 is threaded in a pivoted block 49, which block is pivoted in the fork 50 of the link 51, which link is forked at 52 to engage a pin 53 on a solenoid control lever 54, which lever is pivoted at 55 on a forked extension 56 extending upwardly from the bracket 27.

Mounted on one side of the valve housing 1 is a solenoid housing 60. This solenoid housing contains the main operating solenoid 61 having an armature 62 adapted to reciprocate vertically and terminating in a push pin 63. It also contains the dribble control solenoid 64 including an armature 65 and a dribble push pin 66. The solenoid control lever 54 is guided in the member 67 and where it travels in that member is provided with a fiber cushion 68 in opposition to the end of the push rod 63. The free end of the solenoid lever is provided with a fiber cushion 69 supported on springs 70, the tension on which is adjustable by means of screws 71. This cushion engages a rock lever 72 pivoted on the bracket 73 on the solenoid housing cover 74 from which cover rises the guide 67. 75 indicates a pin and slot arrangement to limit the angular displacement of the member 72. The member 72 engages on its underside the dribble push pin 66 and its purpose is to prevent lateral strain on the dribble or fine adjustment pin 66 so as to get a straight line movement in the operation of the lever to and from the dribble position. The downward excursion of the two solenoid armatures is controlled by means of fiber cushions 76 mounted on adjustable screws 77.

Referring now to Figure 3 and the wiring diagram shown in Figure 1, 80 is a barrel or other reciprocable, mounted on a scale platform 81. 82 is the scale standard and 83 the face of the weighing scale having a weigh indicating hand 84. In normal operation, the hand remains in the neutral position until the major part of the material has flowed into the barrel, through the valve assembly as shown, which in this case is mounted on a bracket 85'. However when most of the material has flowed in, the hand 84 engages the contact point 85 which as will hereinafter appear causes the solenoid 61 to assume the position shown in Figure 1 allowing the solenoid control lever to come down and bring the valve to the dribble position, the lever being held slightly above the position shown in Figure 1 by the dribble solenoid. When the hand 84 goes around to the point 86, the solenoid 64 assumes the position shown in Figure 1 and then the lever 54 causes complete closure of the valve under the influence of the spring 87 which is anchored at one end on the valve housing cover 26 and at the other end in one of the plurality of adjusting holes 88.

Referring specifically to the wiring diagram, 100, 101, are the leads from any suitable source of electric power. The lead 100 communicates directly with each of the solenoid field coils 61 and 64. 102 indicates diagrammatically the relationship at the point 85 between the conductor 101 and the conductor 103, which leads to the main solenoid 61. 104 indicates diagrammatically the relationship at the point 86 between the conductor 101 and the conductor 105 which leads to the dribble solenoid 64. In the wiring diagram as shown the circuit is broken at both points and both solenoids are deenergized and the spring has closed the valve.

In the modified form shown in Figures 4 and 5, the solenoid housing is mounted on a turntable 110. Arranged about this turntable are a series of valve housings 111 identical with the valve housing above referred to, the only difference being that there is substituted for the pivoted block 49 on the valve operating lever, a roller 112. The pivot support for the solenoid operated lever 54 now takes the form of a bracket 113 mounted on the turntable which also carries the solenoid operating mechanism. Handles 114 are provided whereby the turntable may be rotated and the solenoid operated lever 54 is forked at 115 so that as the solenoid operated mechanism is rotated, it may come selectively into engagement with any one of the group of valve levers to operate them. Electrical means will be provided in consonance with this mechanical means so that the weigh mechanism will always be in register with the solenoid operating mechanism no matter what its angular position. This may be done by the usual pair of slip rings and is not illustrated because it forms no part of the invention. By this mechanism, using a plurality of raw materials for ink and the like accurate metering may take place, the main flow and dribble control being available to weigh out each ingredient.

It will be understood that the adjustment of the device is accomplished by changing the position of the lever engaged eyelet with respect to the valve sleeve, by changing the position of the fulcruming of the spring on the solenoid operated lever, and by changing the position and the tension of the pad engaging the link 72 associated with the dribble solenoid, and by changing the position of the fiber cushion which limits the downward excursion of the two solenoid armatures, the elevation of the valve body above the valve seat being jointly controlled by the position of the eyelet on the plunger and by the position of the cushion limiting the downward excursion of the solenoid armature.

We claim:

1. In combination, a valve housing, a valve member reciprocable therein, a lever penetrating the wall of the valve housing to engage the member, a diaphragm packing to close the housing about the lever, a second lever pivoted on the housing, a link connection between the two levers, a solenoid housing associated with the valve housing and a plurality of solenoids contained therein adapted to operate the second lever, yielding means tending to rotate said second lever toward valve closed position, the solenoids being adapted to overcome the yielding means.

2. In combination, a valve housing, a valve member reciprocable therein, a lever penetrating the wall of the valve housing to engage the member, a diaphragm packing to close the housing about the lever, a second lever pivoted on the housing, a link connection between the two levers, a solenoid housing associated with the valve housing and a plurality of solenoids contained therein adapted to operate the second lever, yielding means tending to rotate said second lever toward valve closed position, the solenoids being adapted to overcome the yielding means, means for limiting the excursion of the solenoids in the valve closed direction, means for adjusting the relationship between one of the solenoids and the lever and means for equalizing the solenoids and in selectively controlling them to cause them to independently control the position of the lever.

3. A valve comprising a cylindrical housing, a valve member mounted for longitudinal movement parallel with the axis thereof, a removable closure for one end of the housing having a hollow extension in which the valve stem is slidably mounted, an aperture in the wall of said hollow extension, a pair of opposed truncated centrally apertured conical plates, one of them being mounted on the hollow extension adjacent its center, the periphery being entirely out of contact with the extension, the other truncated conical plate opposed to the first one to form a lenticular chamber between them, there being spherical truncated bearing surfaces encircling the apertures in the conical plates, an apertured diaphragm gripped at its periphery between the peripheries of the plates, a lever extending through the diaphragm and through the apertures in said plates and engaging the valve member at its inner end, power transmission means applied to the outer end of the lever and a ball on the lever through which a part of the diaphragm passes, the ball being seated for movement in the spherical bearing surfaces.

GEORGE C. DAVIS.
GEORGE J. HACHMEISTER.